United States Patent [19]

Sakashita et al.

[11] Patent Number: 5,060,183
[45] Date of Patent: Oct. 22, 1991

[54] PARALLEL MULTIPLIER CIRCUIT USING MATRICES, INCLUDING HALF AND FULL ADDERS

[75] Inventors: Kazuhiro Sakashita; Yoshiki Tsujihashi, both of Itami, Japan

[73] Assignee: Mitsubishi Denki Kabushiki Kaisha, Tokyo, Japan

[21] Appl. No.: 655,229

[22] Filed: Feb. 12, 1991

Related U.S. Application Data

[63] Continuation of Ser. No. 258,223, Oct. 14, 1988, abandoned.

[30] Foreign Application Priority Data

Nov. 19, 1987 [JP] Japan ................................ 62-293520
Nov. 19, 1987 [JP] Japan ................................ 62-293521

[51] Int. Cl.$^5$ ............................................. G06F 7/52
[52] U.S. Cl. ................................................. 364/757
[58] Field of Search ................ 364/757, 758, 759, 760

[56] References Cited

U.S. PATENT DOCUMENTS

| | | | |
|---|---|---|---|
| 3,866,030 | 2/1975 | Baugh et al. | 364/757 |
| 4,130,878 | 12/1978 | Balph et al. | 364/758 |
| 4,168,530 | 9/1979 | Gajski et al. | 364/757 |
| 4,495,593 | 1/1985 | Ware | 364/757 |
| 4,736,335 | 4/1988 | Barkan | 364/758 |
| 4,791,601 | 12/1988 | Tanaka | 364/760 |
| 4,825,401 | 4/1989 | Ikumi | 364/757 |
| 4,839,848 | 6/1989 | Peterson et al. | 364/757 |

FOREIGN PATENT DOCUMENTS 2142636 12/1978 Fed. Rep. of Germany ...... 364/757
61-58036 3/1986 Japan.

OTHER PUBLICATIONS

"A CMOS/SOS Multiplier," Iwamura et al., International Solid-State Circuit Conference, 1984.

*Primary Examiner*—Gary V. Harkcom
*Assistant Examiner*—Long T. Nguyen
*Attorney, Agent, or Firm*—Townsend and Townsend

[57] ABSTRACT

A parallel multiplier utilizing arrays of logic cells. A first circuit logic array forms and sums partial products of the most significant bits of the multiplicand with the multiplier. A second logic array forms and sums partial products of the least significant bits of the multiplier. A third circuit logic array which adds results of the partial product addition performed in parallel by the first and second circuit logic arrays. Since the first and second logic groups execute, respectively, the partial product addition in parallel, the number of adding steps is reduced as a whole and the operation speed is improved. The third logic array is disposed between the first and second logic arrays, resulting in a reasonable structure for circuit integrations and further improving system speed.

16 Claims, 5 Drawing Sheets

IARALLEL MULTILIER CIRCUIT USING MATRICES, INCLUDING HALF AND FULL ADDERS

This is continuation of application Ser. No. 07/258,223, filed Oct. 14, 1988, now abandoned.

BACKGROUND OF THE INVENTION

1. Field of the Invention

The present invention relates to a multiplier, more particularly, it relates to a parallel multiplier and specifically to a configuration of circuit portions which perform its addition.

2. Description of the Prior Art

FIG. 1 is a block diagram showing a general configuration of a prior art parallel multipler of 8 bits×8 bits.

In the figure, numeral 1 denotes an AND circuit which propagates only a result of partial product to the following step, 2 is a half adder for adding a sum and partial product in the preceding step, 3 is a full adder for adding the sum, carry and partial product in the preceding step, numeral 4 indicates a group of adders which add the sum and carry of each position, and FA represents the full adder and HA represents the half adder. The AND circuit 1, half adder 2, full adder 3, full adder FA and half adder HA respectively constitutes logic cell, between which sum signals SS of the sum and carry signals CS of the carry are propagated respectively through signal lines 5 (full lines) and 6 (broken lines).

Referring now to the operation, in FIG. 1, when one lateral line is assumed as one step, first, in the AND circuit in the first step, partial products ($X_0Y_0$ to $X_7Y_0$) of 0 bit ($Y_0$) of a multiplier Y and 0 to 7 bits ($X_0$ to $X_7$) of a multiplicand X are calculated, thereby the AND circuit 1 outputs its result as the sum signal SS to the half adder 2 of the same position in the second step through the signal line 5. In the next second step, the sum signal SS and partial products ($X_0Y_1$ to $X_7Y_1$) are added and its result is outputted to the full adder in the third step as the sum signal SS and carry signal CS together with the sum signal SS of the partial product ($X_7Y_1$). Then, in the third step, the sum signal 5, carry signal 6 and each partial product ($X_0Y_2$ to $X_6Y_2$) are added and in the same way as the second step, the sum signal 5 and carry signal 6 are outputted to the next step. Same additions are repeated till the 8th step, and in a circuit group 4 in the last 9th step, the sum signal 5 and carry signal 6 in each position are added to obtain a final sum (product).

Since the prior art multiplier is constructed as described heretofore, it was disadvantageous in that, an operation speed is delayed because the partial products of each position must be added successively, and as the number of bits increases the adding step increases similarly.

SUMMARY OF THE INVENTION

The present invention has been designed in view of such circumstances, therefore, it is a primary object thereof to provide a multiplier which is designed to improve an operation speed by reducing adding steps of each position, using substantially the same wiring pattern as the prior art multiplier.

It is another object of the present invention, in addition to the first object, to provide a multiplier which is constructed to form an array, in which a propagating direction of the signal is reasonable for circuit integrations.

A multiplier of the present invention divides logic cell arrays for operation into a portion of a first logic cell array correpsonding to partial products of the multiplier and most significant bits of the multiplicand, and into a portion of a second logic cell array corresponding to partial products of the multiplier and remaining, or least significant, bits of the multiplicand, and further comprises a third logic cell array which adds results of the partial product addition performed in parallel by the first and second logic cell arrays, the third logic cell array being disposed between the first and second logic cell arrays, thereby since the first and second logic cell arrays divided execute respectively the partial product addition in parallel, the number of adding steps is reduced as a whole and the operation speed is improved, results in a reasonable structure for circuit integrations.

The above and further objects and features of the present invention will more fully be apparent from the following detailed description with accompanying drawings.

DESCRIPTION OF THE PREFERRED EMBODIMENTS

The present invention will be described in detail in conjunction with the drawings showing its embodiments as follows.

Figure 2:
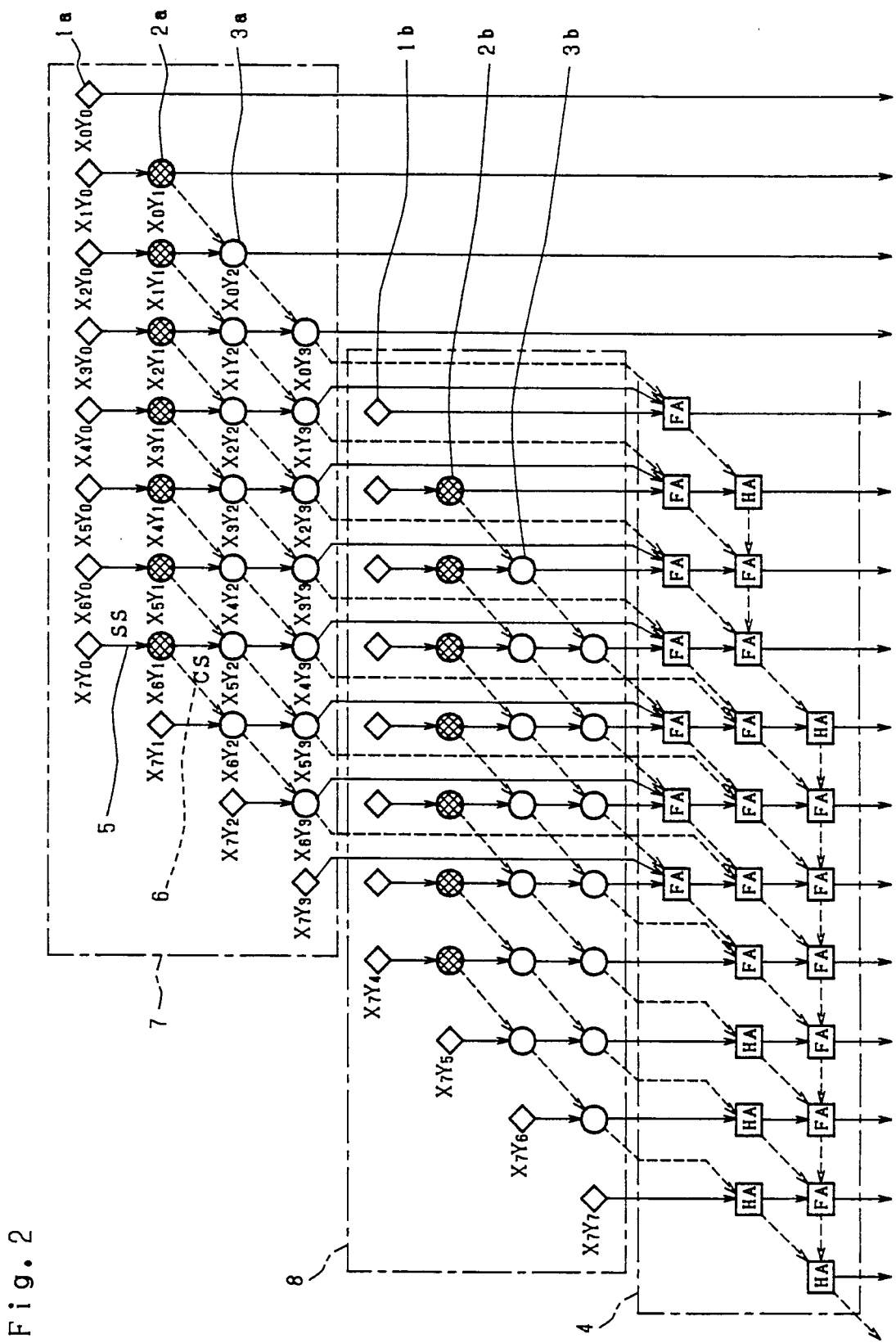
FIG. 2 is a block diagram showing one circuit configuration of the first embodiment of a multiplier of the present invention.

FIG. 2 is a block diagram showing one configuration when the first embodiment of a multiplier of the present invention is used in the multiplier of 8 bits×8 bits.

In FIG. 2, numeral 8 denotes a first logic cell array corresponding to a partial product group of the multiplier and most significant bits of the multiplicand, and numeral 7 denotes a second logic cell array corresponding to a partial product group of the multiplier and remaining bits of the multiplicand.

The most significant bits are those bits of the multiplicand with the greatest place value. These bits are consecutive and in the preferred embodiment of the invention comprise one-half of the bits used to represent the multiplicand. The two logic cell arrays 7 and 8 are equally constructed. That is, 1a and 1b are AND circuits which are logic cell propagating only a result of partial product to the logic cell in the following step, 2a and 2b are half adders which are logic cell for adding sums and partial products in the preceding step and 3a and 3b are full adders which are logic cell for adding sums, carries and partial products in the preceding step.

Figure 1:
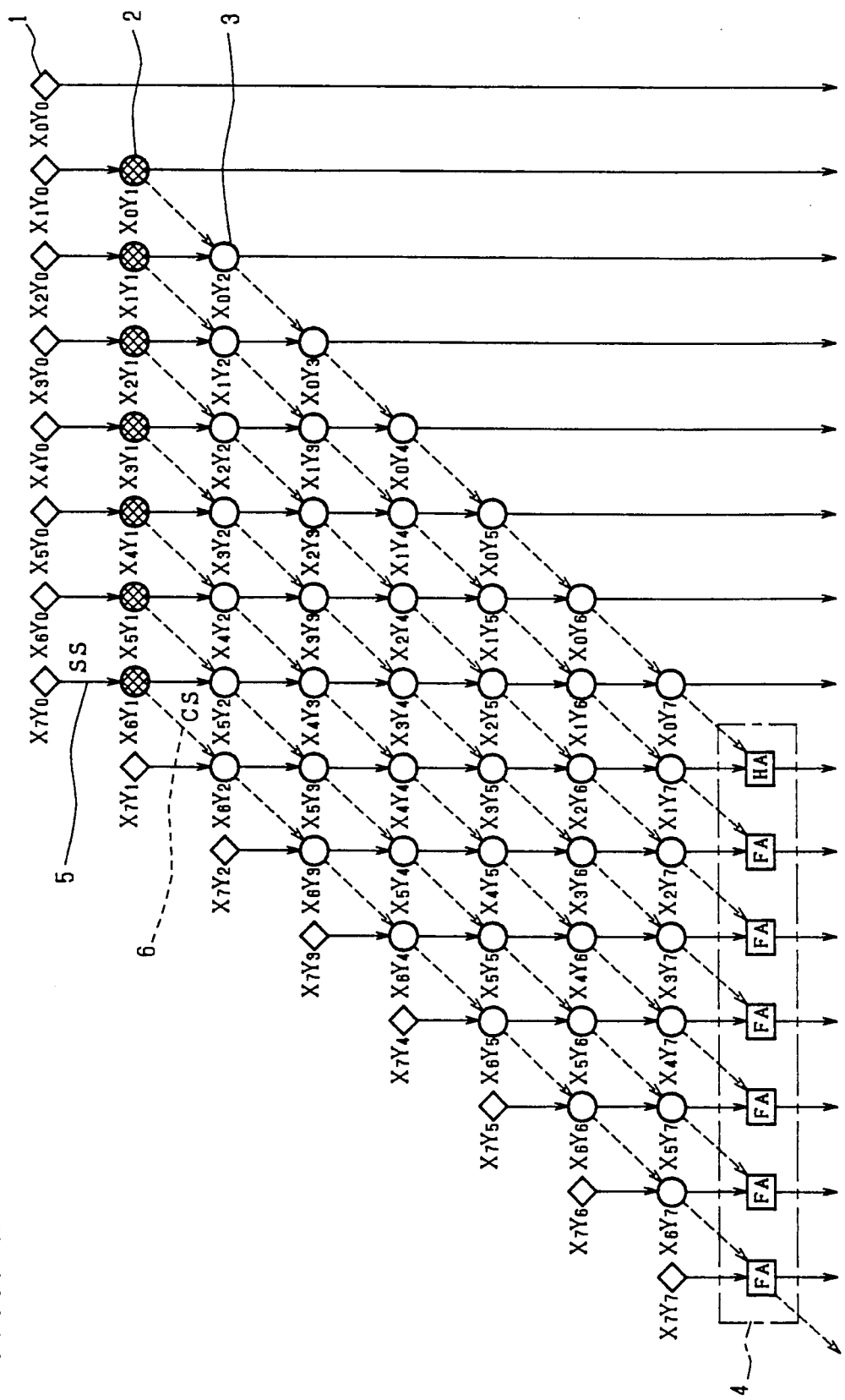
FIG. 1 is a block diagram showing a general circuit configuration of a prior art parallel multiplier.

The two logic cell arrays 7 and 8 are basically constructed in the same way as the aforementioned prior art multiplier shown in FIG. 1 except the number of steps which are reduced to half. Sum signals SS and carry signals CS in the fourth step (last step) of both the logic cell arrays 7 and 8 are given to a third logic cell array 4. As described hereinabove, numeral 4 denotes the third logic cell array which is constructed to further add and output the sums of the logic cell arrays 7 and 8. The third logic cell array 4 is constituted by full adders FA and half adders HA.

The AND circuit 1, half adder 2, full adder 3, half adder HA and full adder FA respectively form a unit circuits, between which sum signals SS of the sum and carry signals CS showing carry are propagated respectively through signal lines 5 (full lines) and 6 (broken lines).

Next, operation of the multiplier of the present invention thus constructed will be explained.

The logic cell arrays 7 and 8 respectively calculate partial products in respective AND circuits in the first steps and output its results to the respective half adders 2a, 2b in the second steps as the sum signals SS.

Specifically, in the logic cell array 7, partial products $X_0Y_0$ to $X_7Y_0$ of the 0 bit $Y_0$ of multiplier Y and the 0 to 7 bits $X_0$ to $X_7$ of multiplicand X are calculated and outputted to the half adders 2a in the second step. While, in the logic cell arrays 8, partial products $X_0Y_4$ to $X_7Y_4$ of the 4 bits $Y_4$ of multiplier Y and the 0 to 7 bits $X_0$ to $X_7$ of multiplicand X are calculated and outputted to the half adders 2b in the second step.

Next, the logic cell arrays 7 and 8 add the sum signals SS and each partial product given from the first step in respective half adders 2a, 2b in the second step and output its results to the respective full adders 3a, 3b in the third step as the sum signals SS and carry signals CS. Specifically, in the logic cell array 7, partial products $X_0Y_1$ to $X_7Y_1$ of the 1 bit $Y_1$ of multiplier Y and the 0 to 7 bits $X_0$ to $X_7$ of multiplicand X are calculated and outputted to the half adders 2a in the second step. While, in the logic cell array 8, partial products $X_0Y_5$ to $X_7Y_5$ of the 5 bits $Y_5$ of multiplier Y and the 0 to 7 bits $X_0$ to $X_7$ of multiplicand X are calculated and outputted to the half adders 2b in the second step.

The same adding process is performed until the last fourth steps of the logic cell arrays 7 and 8. At this time, the adding processes in the logic cell arrays 7 and 8 are performed respectively in parallel. Accordingly, it is possible to reduce the adding steps of the partial product to half from 8 steps in the prior art multiplier.

Finally, the sum signals SS and carry signals CS outputted from the last steps in logic cell arrays 7 and 8 are added between the same position in the third logic cell array 4 to obtain the final sum or product.

Meanwhile, in the third logic cell array 4, addition is performed in three steps which is two steps more than one step in the prior art multiplier, but the more the number of bits to be processed, the greater the reduction effect of the adding steps.

In the aforesaid embodiment, though the logic cell arrays 7 and 8 are divided equally into four steps, in other words, 8 bits are divided into 4 bits each, it is to be understood that it can be divided unequally into five and three steps or two and six steps. However, since the more the number of steps increases which operate in parallel, the more the total adding steps can be reduced, so that the smaller the difference in number of steps in the logic cell arrays 7 and 8 and the larger the number of bits to be processed, the greater the effect.

Figure 3:
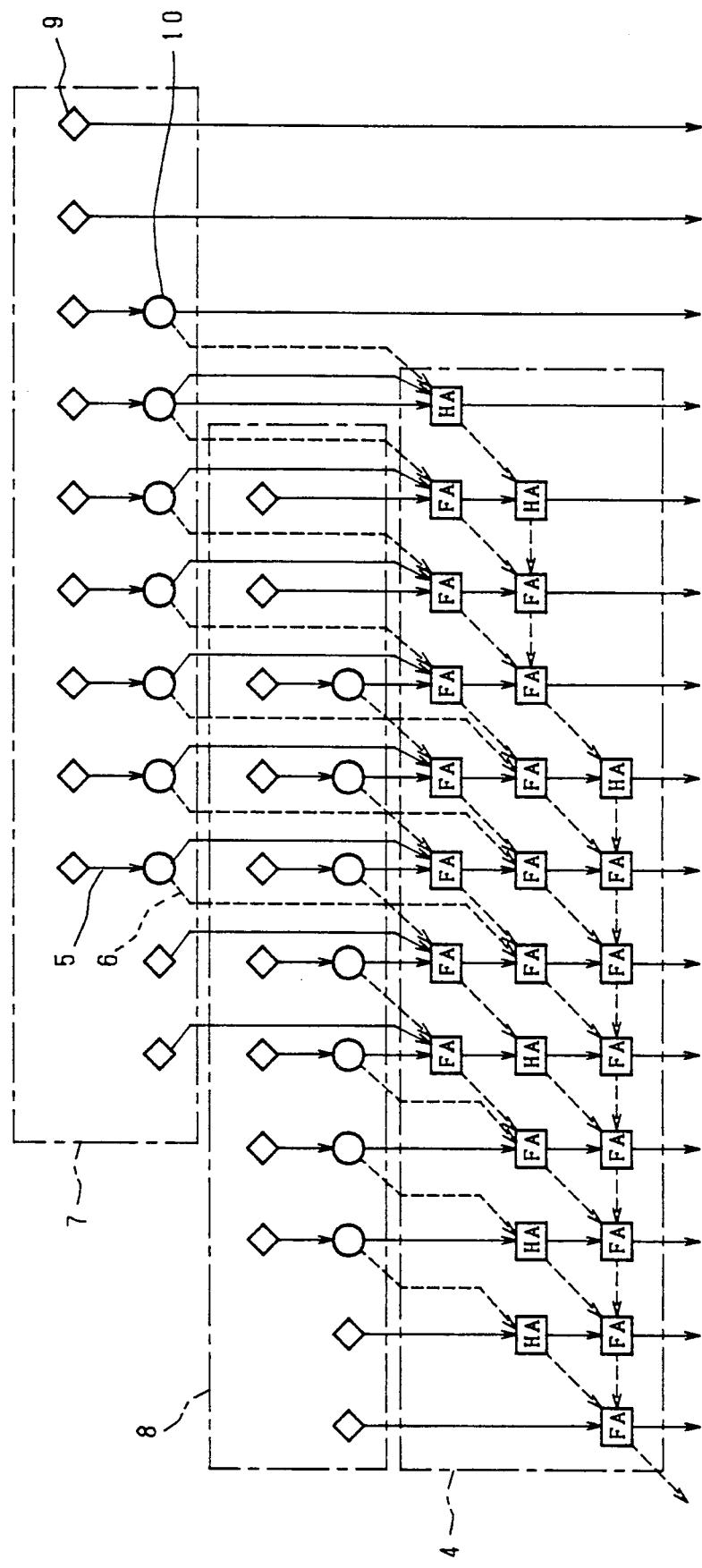
FIG. 3 is a block diagram showing a configuration when its Booth's algorithm is employed.

FIG. 3 is a block diagram showing a configuration of a case when a Booth's algorithm is employed in the aforesaid embodiment.

In FIG. 3, numeral 9 indicates a Booth's shifter and 10 is a half adder with the Booth's shifter. Thus, when the Booth's algorithm is employed in the multiplier of the present invention, the logic cell arrays 7 and 8 can be further reduced to two steps, improving the operation speed correspondingly.

As described heretofore, according to the first embodiment of the present invention, the number of steps in the adding circuit of the multiplier can be reduced to half and the operation speed can be improved while the multiplier maintaining substantially the same wiring pattern as the prior art general multiplier.

Figure 4:
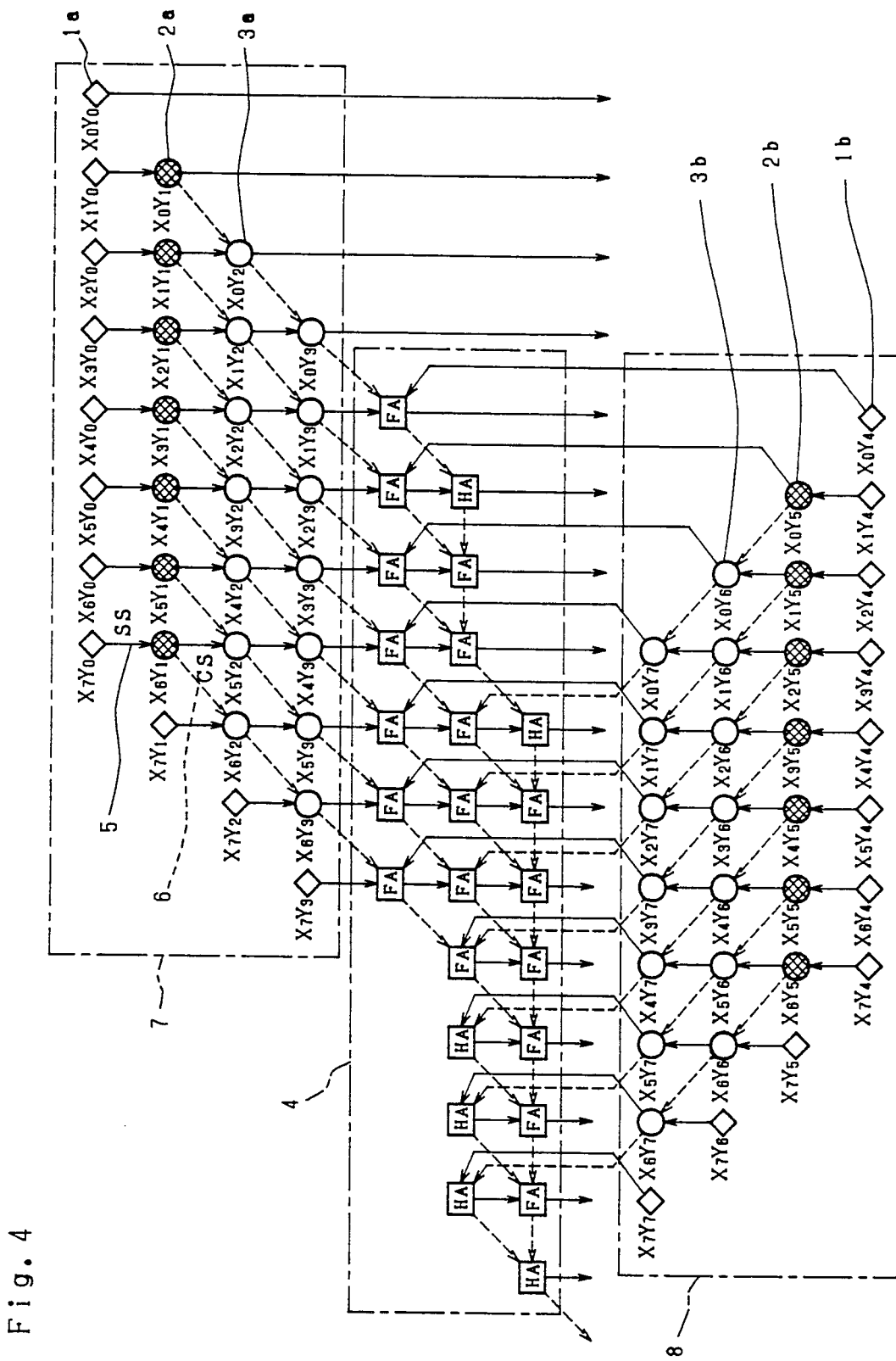
FIG. 4 is a block diagram showing one circuit configuration of the second embodiment of a multiplier of the present invention.

FIG. 4 is a block diagram showing one configuration of the second embodiment of the multiplier of the present invention, wherein the same parts on the corresponding parts are indicated by the same reference numerals as in the aforesaid first embodiment shown in FIG. 2.

In the second embodiment, the third logic cell array 4 is disposed between the logic cell arrays 7 and 8 each unit element of which is arranged and signal lines 5 and 6 are wired such that the sum signals SS and carry signals CS of the circuit groups 7 and 8 are propagated toward the third logic cell array 4.

Though operation of the second embodiment of such multiplier of the present invention is as same as that of the first embodiment, the direction of signal propagation from the logic cell arrays 7 and 8 to the third logic cell array 4 is reasonable and forming an array structure suitable for circuit integrations.

Figure 5:
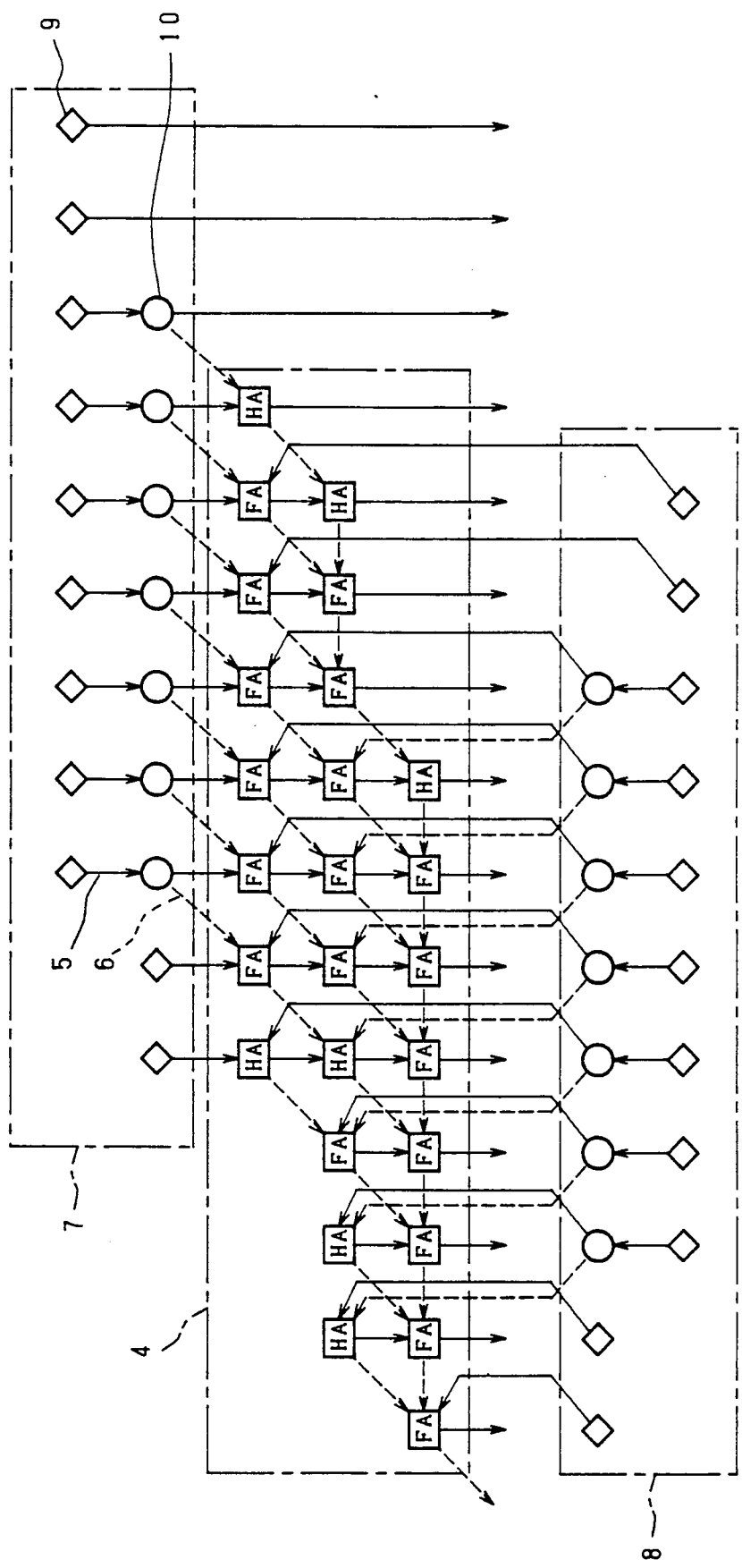
FIG. 5 is a block diagram showing a configuration when its Booth's algorithm is employed.

FIG. 5 is a block diagram showing a configuration when the Booth's algorithm is employed in the second embodiment in the same way as in the aforesaid configuration of FIG. 3 wherein the Booth's algorithm is employed in the first embodiment.

Thus, in the second embodiment of the present invention, in the specific circuit configuration, a preferred array structure is realized, particularly, in circuit integrations.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A parallel multiplier which multiplies a first numeral having at least two bits and including at least one most significant bit and at least one remaining bit by a second numeral, comprising: logic cells having half adders and full adders arranged in a matrix to form logic cell arrays;

said logic cell arrays divided into a first logic cell array which receives said second numeral and the most significant bit of said first numeral and calculates a sum of partial products generated by multiplying the most significant bit of the first numeral by the second numeral, and a second logic cell array which receives said second numeral and the remaining bit of said first numeral and calculates a sum of partial products generated by multiplying the remaining bit of the first numeral not input into said first array by the second numeral;

wherein each bit of said first numeral is input into one of said first and second arrays; and a third logic cell array, coupled to said first and second logic cell arrays, which adds the sum calculated by said first logic cell array to the sum calculated by the second logic cell array.

2. A multiplier as set forth in claim 1, wherein said third logic cell array is disposed between said first and second logic cell arrays.

3. A parallel multiplier circuit for obtaining a product of a first number having n bits, where n>1, multiplied by a second number having m bits, comprising:
   a first array of logic cells for receiving the m bits of the second number and most significant bits of the n bit first number wherein at least one bit of said n bit first number is input into said first array of logic cells;
   a second array of logic cells for receiving the m bits of the second number and the bits of the first number not input to said first array wherein at least one bit of said n bit first number is input into said second array of logic cells;
   a product means, contained within each logic cell of said first and second arrays and which receives as input only one bit of said n bit first number and only one bit of said m bit second number, for producing a partial product term of a single power by multiplying said one bit of said first number with said one bit of the second number;
   seiected logic cells of said first array further include a first adder means, coupled to said product means, for adding the partial product terms of that first array wherein said first adder means are interconnected to add partial product terms of a like power;
   selected cells of said second array further including a second adder means for adding the partial product terms of that second array in parallel with the adder means of the first array wherein said second adder means are interconnected and coupled to said product means of said second array to add partial product terms of a like power; and
   a third array of logic cells, coupled to said first and said second arrays, each logic cell having a summing means for summing an output from the first adder means with an output from the second adder means to produce the product of the first number and the second number.

4. The circuit of claim 3, wherein a quantity of bits comprising the most significant bits substantially equals n/2.

5. A parallel multiplier circuit according to claim 3, wherein said third array is disposed between said first and second arrays.

6. A parallel multiplier circuit for obtaining a product of a first number of n bits, where n>1, multiplied by a second number of m bits, comprising:
   a first array of logic cells for receiving the m bits of the second number and most significant bits of the n bit first number wherein at least one bit of said n bit first number is input into said first array;
   a second array of logic cells for receiving the m bits of the second number and the bits of the first number not input to said first array wherein at least one bit of said n bit first number is input into said second array;
   a product means contained within each logic cell of said first and second arrays for producing a partial product term of a single power by multiplying a bit of said first number with a bit of the second number;
   selected cells of said first array further including a first adder means which are interconnected and coupled to said product means of said first array, for adding the partial product terms of that first array;
   selected cells of said second array further including a second adder means which are interconnected and coupled to said product means of said second array, for adding the partial product terms of that second array in parallel with the first adder means;
   a third array of logic cells, coupled to said first and second arrays, each logic cell of said third array having a means for summing an output from the first adder means with an output from the second adder means and interconnected to produce the product of the first number and the second number; and
   said logic cells of both of said first and second arrays are physically arranged in orthogonal rows and columns to form a parallelogram pattern for each array.

7. An integrated circuit according to claim 6, wherein said third array is disposed between said first and second arrays.

8. The circuit of claim 6, wherein a quantity of bits comprising the most significant bits substantially equals n/2.

9. A parallel multiplier circuit for obtaining a product of a first number of n power bits, where n>1, multiplied by a second number of m power bits, comprising:
   a first array of logic cells for receiving the m bits of the second number and most significant bits of the first number wherein at least one bit of said n power bit first number is input to said first array;
   a second array of logic cells for receiving the m bits of the second number and the bits of the first number not input to said first array wherein at least one bit of said n power bit first number is input to said second array;
   a product means contained within each logic cell of said first and second arrays for producing a partial product term of a single power by multiplying one bit of the first number with a bit of the second number;
   selected logic cells of said first array further including a first adder means which are interconnected and coupled to said product means of said first array, for adding the partial product terms of that first array;
   selected logic cells of said second array further including a second adder means which are interconnected and coupled to said product means of said second array, for adding the partial product terms of the second array in parallel with the first adder means;
   a first half adder, contained within the selected logic cells which obtain the product of the first power bit of the first number multiplied by the lowest power through m−2 power bits of the second number, to form a first portion of said second adder means;
   a second half adder, contained within selected logic cells which obtain the product of the bit which is one power greater than the lowest power bit of the first number which was received by the first array multiplied by the lowest power through m−2 power bits of the second number, to form a first portion of said first adder means;

a full adder, contained within each remaining said selected logic cells, to form a second portion of said first and second adder means;

said selected logic cells comprise each logic cell of said first and second arrays except: logic cells which obtain the product of each bit of the first number multiplied by the most significant power bit of the second number, logic cells which obtain the product of the lowest power bit of the first number received by said second array multiplied by each bit of the m bit second number, logic cells which obtain the product for the lowest power bit of the first number received by said first array multiplied by each bit of the second number; and a third array of logic cells, coupled to said first and second arrays, having a means for summing an output from said first adder means with an output from second adder means to produce the product of the first number and the second number.

10. The circuit according to claim 9, wherein a quantity of bits comprising the most significant bits substantially equals n/2.

11. A parallel multiplier circuit for multiplying a first number of n power bits, where $n > 1$, by a second number of m power bits, comprising:

a first array of logic cells having input lines for receiving the m bits of the second number and most significant bits of the first number wherein at least one bit of said n bit first number is input into said first array;

a second array of logic cells having input lines for receiving the m bits of the second number and the bits of the first number not input to said first array wherein at least one bit of said n bit first number is input into said second array;

a product means contained within each logic cell of said first and second array for producing a partial product term of a single power by multiplying one bit of the first number with a bit of the second number;

selected logic cells of said first array further including a first adder means which are interconnected and coupled to said product means of said first array to add the partial product terms of that array;

selected logic cells of said second array further including a second adder means which are interconnected and coupled to said product means of said second array, to add the partial product terms of that array in parallel with the adder means of the first array;

a first half adder, contained within the logic cells which obtain the product of the first power bit of the first number multiplied by the lowest power through m−2 power bits of the second number, to form a first portion of said second adder means;

a second half adder, contained within logic cells which obtain the product of the bit which is one power greater than the lowest power bit of the first number input to the first array multiplied by the lowest power bits through m−2 power bits of the second number, to form a first portion of said first adder means;

a full adder, contained within each remaining said selected logic cells, to form a second portion of said first and second adder means;

said selected logic cells comprise every logic cell of said first and second arrays except: logic cells which obtain the product of each bit of the first number multiplied by the most significant power bit of the second number, logic cells which obtain the product of the lowest power bit of the first number received by said second array multiplied by each bit of the m bit second number, logic cells which obtain the product for the lowest power bit of the first number placed in said first array multiplied by each bit of the second number;

a third array of logic cells, coupled to said first and second arrays, having a means for combining the adder results of said first and second logic arrays to produce the product of the first number and the second number; and said logic cells of both of said first and second arrays are physically arranged in orthogonal rows and columns to form a parallelogram pattern for each array.

12. An integrated circuit according to claim 11, wherein said third array is disposed between said first and second arrays.

13. The circuit according to claim 11, wherein a quantity of bits comprising the most significant bits substantially equals n/2.

14. A parallel multiplier which multiplies a first numeral of n bits where $n > 1$ by a second numeral of m bits, comprising:

a first, a second and a third logic cell array, each array having a plurality of logic cells;

selected logic cells of said first logic cell array having a Booth's shifter and remaining logic cells of said first logic cell array having a Booth's shifter and a first adder interconnected to calculate a sum of partial products generated by multiplying most significant bits of the first numeral input to said first array, and wherein at least one bit of said first numeral is input into said first array, by the m bits of the second numeral;

selected logic cells of said second array having a Booth's shifter and remaining logic cells of said second array having a Booth's shifter and a second adder interconnected to calculate a sum of partial products generated by multiplying bits of the first numeral input to said second array, wherein at least one bit of said first numeral is input into said second array, by the m bits of the second numeral; and logic cells of said third array having an adder means coupled to said first and second arrays for adding the sum calculated by said first logic cell array to the sum calculated by the second logic cell array.

15. A multiplier set forth in claim 14 wherein said third logic cell array is disposed between said first and second logic cell arrays.

16. A parallel multiplier which multiplies a first numeral having n bits by a second numeral having m bits, comprising:

a first, a second and a third array of logic cells, each array having a plurality of logic cells;

selected logic cells of said first array having a Booth's shifter and remaining logic cells of said first array having a Booth's shifter and a first adder interconnected to calculate a sum of partial products generated by multiplying most significant bits of the first numeral input to said first array, and wherein at least one bit of said first numeral is input into said first array, by the m bits of the second numeral;

selected logic cells of said second array having a Booth's shifter and remaining logic cells of said second array having a Booth's shifter and a second adder interconnected to calculate a sum of partial products generated by multiplying bits of the first numeral not input to said first array, wherein at least one bit of said first numeral is input into said second array, by the m bits of the second numeral;

logic cells of said third array having an adder means coupled to said first and second arrays for adding the sum calculated by said first array to the sum calculated by said second array; and wherein said multiplier is an integrated circuit.

* * * * *